(12) United States Patent
Shimura et al.

(10) Patent No.: US 7,455,933 B2
(45) Date of Patent: Nov. 25, 2008

(54) NONAQUEOUS ELECTROLYTE SECONDARY BATTERY

(75) Inventors: Nao Shimura, Kawasaki (JP); Koshin Tanaka, Tokyo (JP); Masahiro Sekino, Kawasaki (JP); Asako Satoh, Yokohama (JP); Shusuke Inada, Takasaki (JP); Akira Yajima, Tokyo (JP); Masayuki Oguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 544 days.

(21) Appl. No.: 11/121,111

(22) Filed: May 4, 2005

(65) Prior Publication Data

US 2005/0221180 A1 Oct. 6, 2005

Related U.S. Application Data

(63) Continuation of application No. PCT/JP03/14154, filed on Nov. 6, 2003.

(30) Foreign Application Priority Data

Nov. 6, 2002 (JP) ............... 2002-322893

(51) Int. Cl.
 *H01M 4/58* (2006.01)
 *H01M 4/00* (2006.01)
(52) U.S. Cl. ............... 429/231.95; 429/223; 429/218.1
(58) Field of Classification Search .................. None
 See application file for complete search history.

(56) References Cited

U.S. PATENT DOCUMENTS 5,308,720 A 5/1994 Kurokawa et al.
6,045,771 A * 4/2000 Matsubara et al. ....... 423/594.4
6,994,936 B2 * 2/2006 Mori ........................... 429/340
2005/0130035 A1 6/2005 Inada et al.
2005/0221180 A1 10/2005 Shimura et al.

FOREIGN PATENT DOCUMENTS

| JP | 10-69910 | 3/1998 |
| JP | 11-154509 | 6/1999 |
| JP | 2001-297761 | 10/2001 |
| JP | 2002-329528 | 11/2002 |
| JP | 2003-142152 | 5/2003 |

OTHER PUBLICATIONS

U.S. Appl. No. 11/834,451, filed Aug. 6, 2007, Inada, et al.

* cited by examiner

*Primary Examiner*—Patrick Ryan
*Assistant Examiner*—Julian Mercado
(74) *Attorney, Agent, or Firm*—Oblon, Spivak, McClelland, Maier & Neustadt, P.C.

(57) ABSTRACT

A nonaqueous electrolyte secondary battery includes a nonaqueous electrolyte and a positive electrode including an active material containing lithium composite oxide powder, the lithium composite oxide powder includes secondary particles, exhibits a peak intensity ratio satisfying the following formula (4), satisfies the following formula (5), and has a particle distribution wherein a particle diameter at a volumetric cumulative frequency of 90% (D90) falls within the range of 10 to 25 m, and the nonaqueous electrolyte contains a sultone compound including a ring having at least one double bond;

$$2 \leq (I_{003}/I_{104}) < 5 \qquad (4)$$

$$0.95 \leq (X_{Li}/X_M) \leq 1.02. \qquad (5)$$

20 Claims, 4 Drawing Sheets

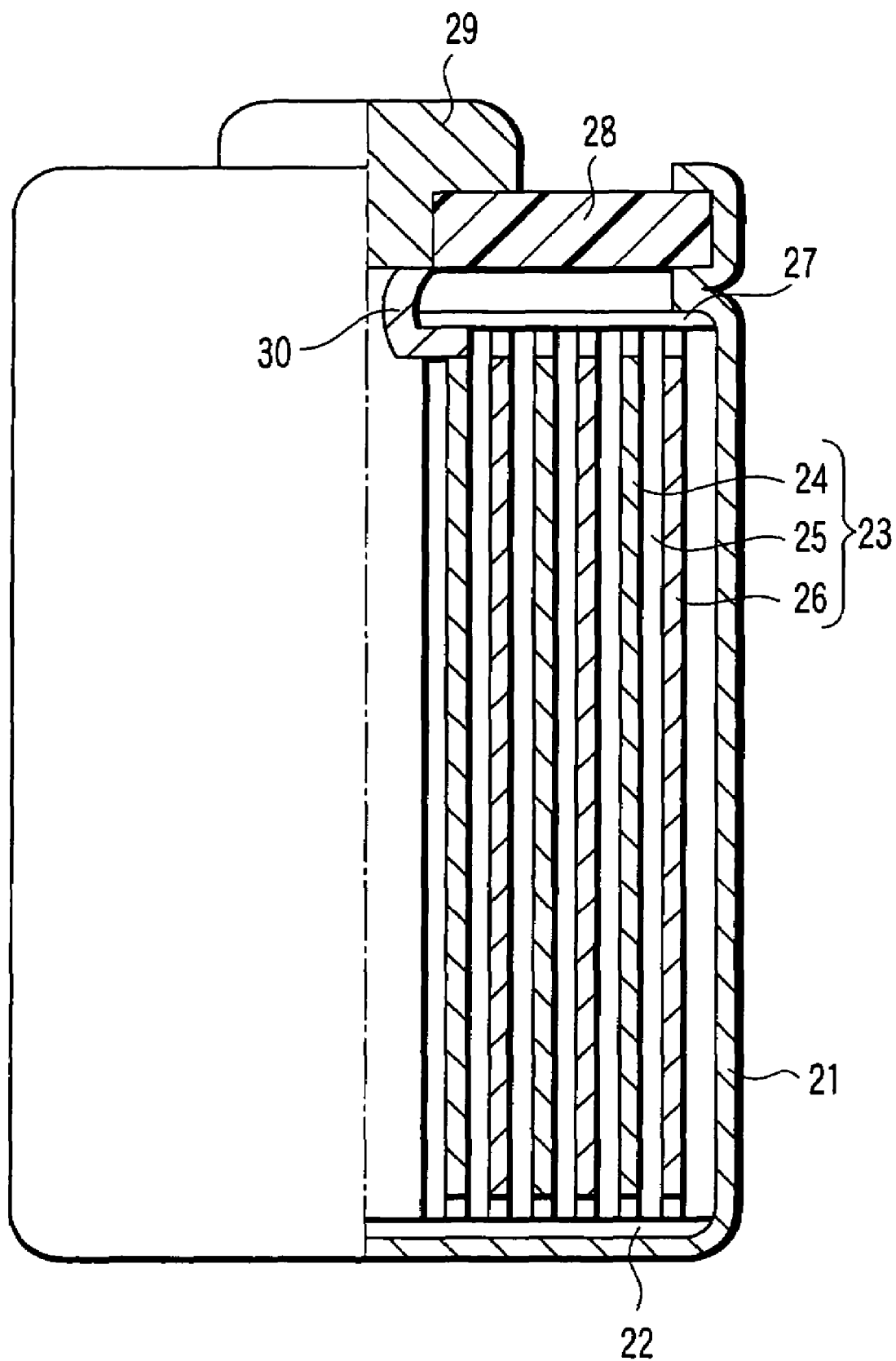
F I G. 4

NONAQUEOUS ELECTROLYTE SECONDARY BATTERY

CROSS REFERENCE TO RELATED APPLICATIONS

This is a Continuation Application of PCT Application No. PCT/JP03/14154, filed Nov. 6, 2003, which was published under PCT Article 21(2) in Japanese.

This application is based upon and claims the benefit of priority from prior Japanese Patent Application No. 2002-322893, filed Nov. 6, 2002, the entire contents of which are incorporated herein by reference.

BACKGROUND OF THE INVENTION

1. Field of the Invention

This invention relates to a nonaqueous electrolyte secondary battery.

2. Description of the Related Art

In recent years, with a view to meeting the demand to further miniaturize and saving weight in electronic equipment such as mobile telecommunication equipment, notebook personal computers, a handheld personal computers, integrated video cameras, portable CD (MD) players, a cellular telephones, etc., there is an increasing demand to develop, as a power source for this electronic equipment, a battery which is especially small in size and very large in capacity.

As for the batteries which are now extensively employed as a power source of this electronic equipment, typical examples thereof include a primary battery such as an alkali-manganese battery, and a secondary battery such as a nickel-cadmium battery and a lead storage battery. Among these batteries, a nonaqueous electrolyte secondary battery where the positive electrode thereof contains a lithium composite oxide and the negative electrode thereof contains a carbonaceous material which is capable of intercalating and releasing lithium ions is now attracting much attention because of the fact that it is possible, with the employment of this nonaqueous electrolyte secondary battery, to realize the miniaturization and weight reduction of the battery, and to enhance the cell voltage as well as energy density.

As for active materials for the positive electrode of the nonaqueous electrolyte secondary battery, it is proposed in Japanese Laid-open Patent Publication (Kokai) No. 10-69910 (1998) to employ lithium nickel composite oxide represented by a general formula (1) of $Li_{y-x1}Ni_{1-x2}M_xO_2$, features being that a diffraction peak ratio at (003) plane and (104) plane, i.e. (003)/(104), in terms of Miller indices "hkl" of X-ray diffraction, is not less than 1.2, that an average particle diameter "D" falls within the range of 5 to 100 μm, and that the particle size distribution is such that 10% thereof is 0.5 D or more and 90% thereof is 2 D or less.

However, the secondary battery comprising a positive electrode containing this kind of lithium nickel composite oxide is accompanied with a problem that since an oxidative decomposition reaction is permitted to take place in the nonaqueous electrolyte, the charge/discharge cycle life of the battery is relatively short.

BRIEF SUMMARY OF THE INVENTION

One of the objects of the present invention is to provide a nonaqueous electrolyte secondary battery which is improved in charge/discharge cycle life.

According to a first aspect of the present invention, there is provided a nonaqueous electrolyte secondary battery comprising a negative electrode, a nonaqueous electrolyte, and a positive electrode containing an active material containing lithium composite oxide particles; wherein the lithium composite oxide particles have a composition containing element M including Ni and/or Co, include secondary particles, and exhibit a peak intensity ratio that satisfies the following formula (1), a content of the lithium composite oxide particles in the active material is at least 50 wt %;

the active material satisfies the following formula (2), and has a particle distribution wherein a particle diameter at a volumetric cumulative frequency of 90% (D90) falls within the range of 10 to 25 μm; and the nonaqueous electrolyte contains a sultone compound including a ring having at least one double bond;

$$2 \leq (I_{003}/I_{104}) < 5 \quad (1)$$

$$0.95 \leq (Y_{Li}/Y_M) \leq 1.02 \quad (2)$$

wherein $I_{003}$ is a peak intensity (cps) at (003) plane in powder X-ray diffraction of the lithium composite oxide particles; $I_{104}$ is a peak intensity (cps) at (104) plane in the powder X-ray diffraction; $Y_{Li}$ is the number of moles of lithium in the active material; and $Y_M$ is the number of moles of the element M in the active material.

Further, according to a second aspect of the present invention, there is provided a nonaqueous electrolyte secondary battery comprising a negative electrode, a nonaqueous electrolyte, and a positive electrode including an active material containing lithium composite oxide powder; wherein the lithium composite oxide powder includes secondary particles, exhibits a peak intensity ratio satisfying the following formula (4), satisfies the following formula (5), and has a particle distribution wherein a particle diameter at a volumetric cumulative frequency of 90% (D90) falls within the range of 10 to 25 μm;

the nonaqueous electrolyte contains a sultone compound including a ring having at least one double bond;

$$2 \leq (I_{003}/I_{104}) < 5 \quad (4)$$

$$0.95 \leq (X_{Li}/X_M) \leq 1.02 \quad (5)$$

wherein $I_{003}$ is a peak intensity (cps) at (003) plane in powder X-ray diffraction of the lithium composite oxide powder; $I_{104}$ is a peak intensity (cps) at (104) plane in the powder X-ray diffraction; $X_{Li}$ is the number of moles of lithium in the lithium composite oxide powder; and $X_M$ is the number of moles of an element M in the lithium composite oxide powder, the element M being Ni and/or Co.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a partially cross-sectional view illustrating a cylinder type nonaqueous electrolyte secondary battery representing a further embodiment of the nonaqueous electrolyte secondary battery according to the present invention.

DETAILED DESCRIPTION OF THE INVENTION

Figure 1:
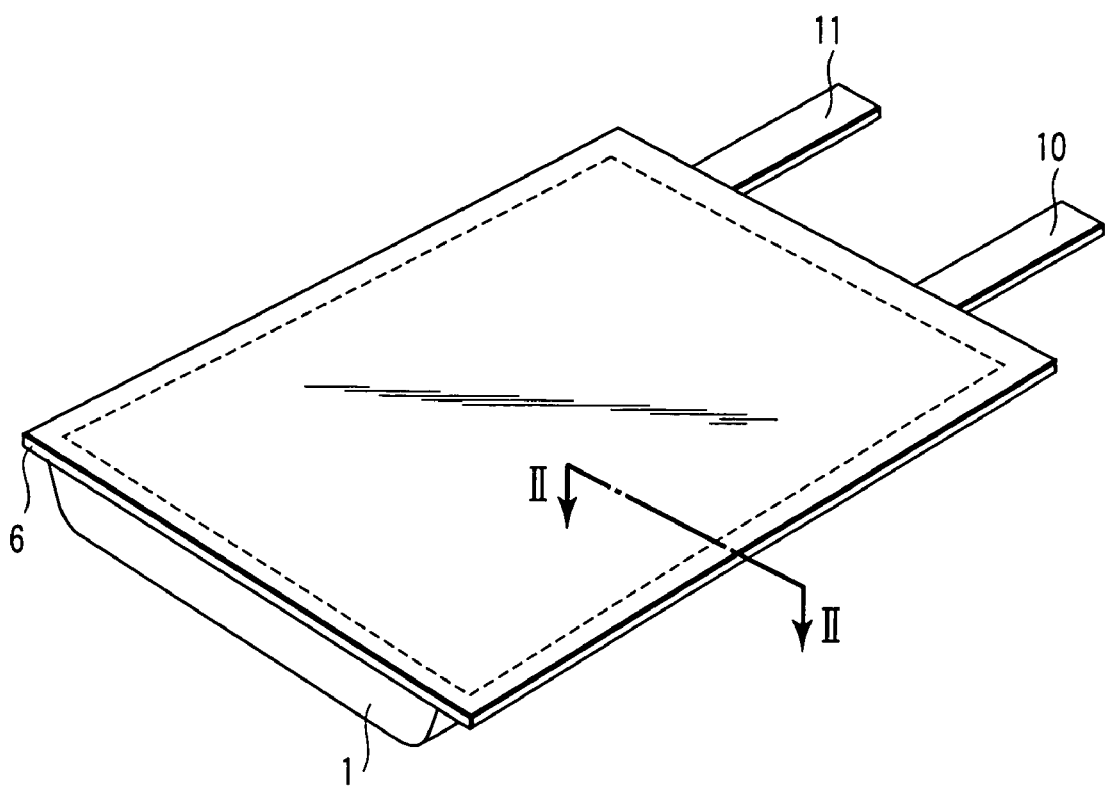
FIG. 1 is a perspective view illustrating a sheet type nonaqueous electrolyte secondary battery representing one embodiment of the nonaqueous electrolyte secondary battery according to the present invention.

A first and a second nonaqueous electrolyte secondary batteries according to the present invention will be explained as follows.

The first nonaqueous electrolyte secondary battery according to the present invention comprises a negative electrode, a nonaqueous electrolyte, and a positive electrode including an active material containing lithium composite oxide powder.

The lithium composite oxide powder includes secondary particles, satisfies the following formula (B), exhibits a peak intensity ratio that satisfies the following formula (A), and has a particle distribution wherein a particle diameter at a volumetric cumulative frequency of 90% (D90) falls within the range of 10 to 25 μm;

$$2 \leq (I_{003}/I_{104}) < 5 \tag{A}$$

$$0.95 \leq (X_{Li}/X_M) \leq 1.023 \tag{B}$$

wherein $I_{003}$ is a peak intensity (cps) at (003) plane in powder X-ray diffraction of the lithium composite oxide powder; $I_{104}$ is a peak intensity (cps) at (104) plane in said powder X-ray diffraction; $X_{Li}$ is the number of moles of lithium in the lithium composite oxide powder; and $X_M$ is the number of moles of an element M in the lithium composite oxide powder, the element M being Ni and/or Co.

The nonaqueous electrolyte contains a sultone compound including a ring having at least one double bond.

The aforementioned sultone compound is enabled to open its double bond on the occasion of the initial charging so as to initiate the polymerization reaction thereof, thereby forming a lithium ion-permeable protective film on the surface of the positive electrode. On the other hand, the lithium composite oxide powder is featured in that the magnitude of expansion and contraction thereof to be caused to occur on the occasion of absorption and release of lithium ions or lithium element are relatively small, and that, since not only the surface of the secondary particles but also the interstice between the primary particles are covered with the protective film, it is possible to create a complex network structure of the protective film. As a result, it is possible to inhibit the peeling of the protective film from the positive electrode in the course of charge/discharge cycle, thereby making it possible to suppress the oxidative decomposition reaction of the nonaqueous electrolyte and therefore to improve the charge/discharge cycle life of the secondary battery.

Next, specific features of the positive electrode, the negative electrode and the nonaqueous electrolyte will be explained as follows.

1) Positive Electrode

This positive electrode comprises an electronic collector, and a positive electrode layer which is held to one or both surfaces of the electronic collector and contains an active material for positive electrode, a binder, and a conductor.

The lithium composite oxide can be synthesized by a process wherein the compounds (for example, oxides, hydroxides, etc.) of constituent elements are mixed with each other and then sintered in an air or oxygen atmosphere.

Followings are explanations of reason for limiting the molar ratio $(X_{Li}/X_M)$ in the lithium composite oxide to the range of 0.95 to 1.02. If the molar ratio $(X_{Li}/X_M)$ is less than 0.95, the crystallinity of the oxide would be considerably degraded, giving rise to the possibility that the absorption and releasing of lithium ions or lithium element can scarcely take place. On the other hand, if the molar ratio $(X_{Li}/X_M)$ is increased larger than 1.02, the ratio of primary particles would be increased due to the progress of grain growth during the sintering thereof even though the crystallinity of the oxide would become excellent. As a result, the expansion and contraction of the oxide resulting from the absorption and releasing of lithium ions or lithium element would become more prominent and at the same time, the protective film covering the primary particles would be isolated to make it difficult to create a network structure. As a result, the protective film is more likely to be caused to peel off during the charge/discharge cycle, resulting in a shortened charge/discharge cycle life. More preferably, the range of molar ratio $(X_{Li}/X_M)$ can be 0.97 to 1.02, most preferably 0.99 to 1.02.

As for specific examples of the lithium composite oxide, they include lithium nickel composite oxide, lithium cobalt composite oxide, lithium nickel cobalt composite oxide, etc. The lithium composite oxide may contain elements other than lithium and the element M. Examples of such elements include, for example, Mn, Al, Sn, Fe, Cu, Cr, Zn, Mg, Si, P, F, Cl and B. These elements may be included therein singly or in combination of two or more kinds.

Preferably, the lithium composite oxide is included in the active material for positive electrode at a ratio of at least 50%.

Next, the reasons for limiting the ratio $(I_{003}/I_{104})$ to the aforementioned range will be explained. The lithium composite oxide exhibiting 5 or more in the peak intensity ratio $(I_{003}/I_{104})$ is excellent in crystallinity but has plate-like shape due to the rapid grain growth thereof, thus resulting in an increase in the ratio of primary particles which is high in crystal orientation. As a result, the expansion and contraction of the oxide resulting from the absorption and releasing of lithium ions or lithium element would become more prominent and at the same time, the protective film covering the primary particles would be isolated to make it difficult to create a network structure. As a result, the protective film is more likely to be caused to peel off in the repetition of the charge/discharge cycle, resulting in a shortened charge/discharge cycle life. When the peak intensity ratio $(I_{003}/I_{104})$ is not less than 2 and less than 5, the ratio of the secondary particles can be increased and at the same time, the expansion and contraction of the oxide resulting from the absorption and releasing of lithium ion can be minimized. Incidentally, when the crystal of the composite oxide is not orientated and is completely isotropic, the peak intensity ratio $(I_{003}/I_{104})$ would become 2 theoretically. Thus, the range of the peak intensity ratio $(I_{003}/I_{104})$ should more preferably be larger than 2 and not more than 4.95.

Next, the reasons for confining the particle diameter at a volumetric cumulative frequency of 90% (D90) of the lithium composite oxide powder to the aforementioned range will be explained as follows. If D90 is less than 10 μm, since the number of primary particles for constituting the secondary particles tends to decrease, the contact area between the secondary particles and the protective film becomes insufficient, rendering the protective film to peel off more easily, thus possibly resulting in a shortened charge/discharge cycle life. On the other hand, if D90 is larger than 25 μm, since the number of primary particles for constituting the secondary particles tends to increase, it would become impossible for the protective film to reach the interior of the secondary particles, thus creating nearly a state where only the surface of the secondary particles is covered by the protective film. As a result, the protective film is more likely to be caused to peel off during the charge/discharge cycle, resulting in a shortened charge/discharge cycle life. More preferable range of D90 would be 10 to 20 μm.

As for the conductor, it is possible to employ, for example, acetylene black, carbon black, graphite, etc.

The binder functions to enable the active material to be held to the electronic collector and to enable the active material to join with each other. As for specific examples of the binder, they include, for example, polytetrafluoroethylene (PTFE), polyvinylidene fluoride (PVdF), polyether sulfone, ethylene-propylene-diene copolymer (EPDM), styrene-butadiene rubber (SBR), etc.

The mixing ratios of the active material for positive electrode, the conductor and the binder should preferably be confined within the ranges of: 80-95 wt % for the active material for positive electrode, 3-20 wt % for the conductor, and 2-7 wt % for the binder.

As for the electronic collector, it is possible to employ a conductive substrate of porous structure or a non-porous conductive substrate. These conductive substrates can be formed, for example, by aluminum, stainless steel or nickel.

This positive electrode can be manufactured in such a manner that an active material for positive electrode, a conductor and a binder are mixed with a suitable solvent to form a suspension, which is then coated on an electronic collector, dried and pressed.

2) Negative Electrode

This negative electrode comprises an electronic collector, and a negative electrode layer which is held to one or both surfaces of the electronic collector.

The negative electrode layer comprises a carbonaceous material for intercalating and releasing lithium ions or lithium element, and a binder.

As for the carbonaceous material, it is possible to employ, for example, graphitized material or carbon material such as graphite, coke, carbon fiber, spherical carbon, pyrolytic vapor-phase carbon material, calcined resin; and graphitized material or carbon material that can be obtained through a heat treatment at a temperature of 500 to 3000° C. of thermosetting resin, isotropic pitch, mesophase pitch-based carbon, mesophase pitch-based carbon fiber, mesophase globule, etc. Especially, in view of high capacity and excellent charge/discharge cycle characteristics, mesophase pitch-based carbon fiber is more preferable. Among them, more preferable examples are graphitized material having a graphite crystal where the spacing $d_{002}$ Of (002) plane is 0.34 nm or less. It is possible, through the employment of an nonaqueous electrolyte secondary battery comprising a negative electrode containing these graphitized material as a carbonaceous material, to greatly enhance the cell capacity and large current discharge characteristics. It is more preferable that the aforementioned spacing $d_{002}$ is 0.337 nm or less.

As for the binder, it is possible to employ, for example, polytetrafluoroethylene (PTFE), polyvinylidene fluoride (PVdF), ethyelene-propylene-diene copolymer (EPDM), styrene-butadiene rubber (SBR), carboxymethyl cellulose (CMC), etc.

The mixing ratios of the aforementioned carbon material and the binder should preferably fall within the ranges of: 90 to 98 wt % for the carbon material, and 2 to 20 wt % for the binder.

As for the electronic collector, it is possible to employ a conductive substrate of porous structure or a non-porous conductive substrate. These conductive substrates can be formed, for example, by copper, stainless steel or nickel.

This negative electrode can be manufactured in such a manner that a carbonaceous material which is capable of intercalating and releasing lithium ions or lithium element, and a binder are kneaded together in the presence of a suitable solvent to form a suspension, which is then coated on an electronic collector and dried. Then, the resultant body is subjected to single-stage press or multi-stage press 2 to 5 times of pressing at a desired pressure to manufacture the negative electrode.

Thereafter, by making of these positive and negative electrodes constructed as described above, an electrode group is fabricated.

Namely, this electrode group can be manufactured in various manners such for example as (i) a laminate comprising the positive electrode, the negative electrode and a separator interposed between these electrodes is spirally wound to form an electrode group; (ii) a laminate comprising the positive electrode, the negative electrode and a separator interposed between these electrodes is wound into a flattened electrode group; (iii) a laminate comprising the positive electrode, the negative electrode and a separator interposed between these electrodes is spirally wound and then radially compressed to form an electrode group; (iv) a laminate comprising the positive electrode, the negative electrode and a separator interposed between these electrodes is folded once or more; and (v) the positive electrode and the negative electrode are laminated one after another with a separator being interposed therebetween to form a laminate of electrodes.

This electrode group may not be subjected to pressing. However, in order to enhance the strength of integrated structure of the positive electrode, the negative electrode and the separator, this electrode group may be subjected to pressing. Further, this pressing may be performed under a heated condition.

In order to enhance the strength of integrated structure of the positive electrode, the negative electrode and the separator, this electrode group may contain an adhesive polymer. As for this adhesive polymer, specific examples thereof include polyacrylonitrile (PAN), polyacrylate (PMMA), polyvinylidene fluoride (PVdF), polyvinyl chloride (PVC), polyethylene oxide (PEO), etc.

As for the separator to be employed in this electrode group, it is possible to employ microporous film, woven fabric, non-woven fabric, a laminate formed of the same material or different materials selected from these film and fabrics. As for the materials to be employed for fabricating the separator, it is possible to employ polyethylene, polypropylene, ethylene-propylene copolymer, ethylene-butene copolymer, etc. One kind or two or more kinds of materials selected from the aforementioned materials may be employed as a raw material for fabricating the separator.

The thickness of the separator should preferably be 30 μm or less, more preferably 25 μm or less. Further, the separator should preferably have a thickness of at least 5 μm, more preferably at least 8 μm.

The heat shrinkage rate of the separator should preferably be 20% or less, more preferably 15% or less under the condition of one-hour heating at a temperature of 120° C.

The porosity of the separator should preferably fall within the range of 30 to 60%, more preferably 35 to 50%.

The air permeability of the separator should preferably be 600 seconds/100 cm$^3$ or less. This air permeability represents the time (seconds) needed for 100 cm$^3$ of air to pass through the separator. It is preferable to set the upper limit of the air permeability to 500 seconds/100 cm$^3$. Further, the lower limit of the air permeability should preferably be set to 50 seconds/100 cm$^3$, more preferably 80 seconds/100 cm$^3$.

The width of the separator should preferably be set larger than the width of any of the positive electrode and the negative electrode. By constructing the separator in this manner, it is possible to prevent the positive electrode from contacting directly with the negative electrode.

3) Nonaqueous Electrolyte

As for the nonaqueous electrolyte, it is possible to employ a substance which is substantially liquid or gel-like.

Next, details on the nonaqueous solvent and the electrolyte to be included in liquid nonaqueous electrolyte and gel-like nonaqueous electrolyte will be explained.

The nonaqueous solvent includes a sultone compound containing at least one double bond in the ring thereof.

As for the sultone compound containing at least one double bond in the ring thereof, it is possible to employ a sultone compound A represented by the general formula shown in the following chemical formula 1 or a sultone compound B wherein at least one hydrogen atom in the sultone compound A is replaced by a hydrocarbon group. Incidentally, in this invention, the sultone compound A and the sultone compound B can be employed singly or in combination with each other.

(Chemical formula 1)

In chemical formula 1, $C_mH_m$ is a linear hydrocarbon group; and m and n are both an integer of 2 or more satisfying the relationship of 2m>n.

The sultone compound containing at least one double bond in the ring thereof is enabled to react with the positive electrode to open the double bond thereof, thus allowing the polymerization thereof to take place and resulting in the formation of a lithium ion-permeable protective film on the surface of the positive electrode. More preferable examples of the sultone compound are some kinds of the sultone compound A where m is 3 and n is 4, i.e. 1,3-propene sultone (PRS), or where m is 4 and n is 6, i.e. 1,4-butylene sultone (BTS). These sultone compounds, i.e. 1,3-propene sultone (PRS) and 1,4-butylene sultone (BTS) may be employed singly or in combination with each other.

The mixing ratio of the sultone compound should preferably be 10% by volume at most. Because if the mixing ratio of the sultone compound exceeds over 10% by volume, the thickness of the aforementioned protective film would be greatly increased to degrade the lithium ion permeability, resulting in the lowering of discharge capacity at temperatures lower than room temperature. Further, in order to secure high discharge capacity even at a low temperature of as low as −20° C. for example, the mixing ratio of the sultone compound should preferably be 4% by volume or less. Furthermore, in order to secure a sufficient formation of the protective film, the mixing ratio of the sultone compound should preferably be at least 0.01% by volume. Additionally, if the mixing ratio of the sultone compound is 0.1% by volume or more, it would be possible to secure a sufficient protective function of the protective film even at a higher temperature of 65° C. for example.

It is preferable that the nonaqueous solvent further comprises ethylene carbonate (EC). The mixing ratio of EC in the nonaqueous solvent should preferably fall within the range of 25-to 50% by volume. When EC is included in the nonaqueous solvent in this manner, it is possible to obtain a nonaqueous solvent which is high in electric conductivity and has a suitable degree of viscosity. More preferably, the mixing ratio of EC should fall within the range of 25 to 45% by volume.

As for the nonaqueous solvent, it is also possible to employ other kinds of solvents in combination with a sultone compound and EC. Specific examples of said other kinds of solvents include, for example, chain carbonate {for example, methyl ethyl carbonate (MEC), diethyl carbonate (DEC), dimethyl carbonate (DMC), etc.}, vinylene carbonate (VC), vinyl ethylene carbonate (VEC), phenyl ethylene carbonate (phEC), propylene carbonate (PC), γ-butyrolactone (GBL), γ-valerolactone (VL), methyl propionate (MP), ethyl propionate (EP), 2-methyl furan (2Me-F), furan (F), thiophene (TIOP), catechol carbonate (CATC), ethylene sulfite (ES), 12-crown-4 (Crown), tetraethyleneglycol dimethyl ether (Ether), etc. The aforementioned other kinds of solvents may be employed singly or in combination of two or more kinds.

As for specific examples of the electrolyte to be dissolved in the nonaqueous solvent, they include lithium salts such as lithium perchlorate (LiClO$_4$), lithium hexafluorophosphate (LiPF$_6$), lithium tetrafluoroborate (LiBF$_4$), lithium hexafluoroarsenate (LiAsF$_6$), lithium trifluoromethanesulfonate (LiCF$_3$SO$_3$), lithium bis-trifluoro methyl sulfonylimide [LiN(CF$_3$SO$_2$)$_2$], LiN(C$_2$F$_5$SO$_2$)$_2$, etc. These electrolytes may be employed singly or in combination of two or more kinds.

The quantity of these electrolytes to be dissolved in the nonaqueous solvent should preferably fall within the range of 0.5 to 2.5 mol/L, more preferably 1 to 2.5 mol/L.

In order to enhance the wettability of the nonaqueous electrolyte to the separator, it is preferable to incorporate a surfactant such as trioctyl phosphate (TOP) into the liquid nonaqueous electrolyte. The mixing ratio of such a surfactant in the nonaqueous electrolyte should preferably be not more than 3%, more preferably within the range of 0.1 to 1%.

The quantity of the liquid nonaqueous electrolyte in the secondary battery should preferably fall within the range of 0.2 to 0.6 g per 100 mAh of battery unit capacity. A more preferable range of the quantity of the liquid nonaqueous electrolyte in the secondary battery would be 0.25 to 0.55 g/100 mAh.

Next, the case in which the aforementioned electrode group and nonaqueous electrolyte can be housed will be explained.

With respect to the configuration of the case, it may be a bottomed cylinder, a prismatic case, a bag-like case, a cup-like case, etc.

These cases can be manufactured using a film including a resin layer, a metal plate, a metal film, etc.

As for the resin layer to be included in the film, it may be formed of polyolefin (such as polyethylene, polypropylene), polyamide, etc. Among the films comprising a resin layer, it is more preferable to employ a laminate film comprising a metal layer, and a pair of protective layers formed on the opposite surfaces of the metal layer. The metal layer has a role of preventing the permeation of water and serves to retain the shape of the case. As for the metal layer, it is possible to employ aluminum, stainless steel, iron, copper, nickel, etc. Among them, it is more preferable to employ aluminum since aluminum is light in weight and excellent in capability of preventing the permeation of water. This metal layer may be formed of only one kind of +metal or of a combination of two or more kinds of metal layers. Among this couple of protective layers, one of them which is located in contact with the external atmosphere has a role of preventing the damage of the metal layer. This outer protective layer may be formed of a single resin layer or a combination of two or more kinds of resin layers. On the other hand, the inner protective layer has a role of preventing the metal layer from being corroded by the nonaqueous electrolyte. This inner protective layer may be formed of a single resin layer or a combination of two or more kinds of resin layers. In order to enable the case to be sealed by means of heat sealing, a thermoplastic resin may be provided to the surface of this inner protective layer.

As for the thickness of the film comprising a resin layer, it is preferable to be 0.3 mm or less, more preferably 0.25 mm or less, further preferably 0.15 mm or less, most preferably 0.12 mm or less. However, if the thickness of the film is less than 0.05 mm, the deformation or damage of the film is more likely caused to occur. Therefore, it is preferable that the thickness of the film should be at least 0.05 mm.

The metal plate and the metal film can be formed, for example, from iron, stainless steel or aluminum.

As for the thickness of the metal plate and the metal film, it is preferable to be 0.4 mm or less, more preferably 0.3 mm or less, most preferably 0.25 mm or less. However, if the thickness of the metal plate and the metal film is less than 0.05 mm, it may become impossible to secure a sufficient mechanical strength. Therefore, it is preferable that the thickness of the metal plate and the metal film should be at least 0.05 mm.

The second nonaqueous electrolyte secondary battery according to the present invention comprises a negative electrode, a nonaqueous electrolyte, and a positive electrode containing an active material containing lithium composite oxide particles.

The lithium composite oxide particles have a composition containing element M including Ni and/or Co, includes secondary particles, and exhibits a peak intensity ratio satisfying the following formula (C);

a content of the lithium composite oxide particles in the active material is at least 50 wt %;

the active material satisfies the following formula (D), and has a particle distribution wherein a particle diameter at a volumetric cumulative frequency of 90% (D90) falls within the range of 10 to 25 μm;

$$2 \leq (I_{003}/I_{104}) < 5 \qquad (C)$$

$$0.95 \leq (Y_{Li}/Y_M) \leq 1.02 \qquad (D)$$

wherein $I_{003}$ is a peak intensity (cps) at (003) plane in powder X-ray diffraction of the lithium composite oxide particles; $I_{104}$ is a peak intensity (cps) at (104) plane in said powder X-ray diffraction; $Y_{Li}$ is the number of moles of lithium in the active material; and $Y_M$ is the number of moles of the element M in the active material.

The nonaqueous electrolyte contains a sultone compound including a ring having at least one double bond.

In the second nonaqueous electrolyte secondary battery according to the present invention, all of the constituent features thereof, excluding the positive electrode, are the same as those of the aforementioned first nonaqueous electrolyte secondary battery. Next, the features of the-positive electrode will be explained.

This positive electrode comprises an electronic collector, and a positive electrode layer which is held to one or both surfaces of the electronic collector and contains a particulate active material for positive electrode, a binder, and a conductor.

When the peak intensity ratio $(I_{003}/I_{104})$ of the lithium composite oxide particle containing the element M is not less than 2 and less than 5, the ratio of the secondary particles can be increased and at the same time, the expansion and contraction of the oxide resulting from the absorption and releasing of lithium ions or lithium element can be minimized. Incidentally, when the crystal of the composite oxide is not orientated and is completely isotropic, the peak intensity ratio $(I_{003}/I_{104})$ would become 2 theoretically. Thus, the range of the peak intensity ratio $(I_{003}/I_{104})$ should more preferably be larger than 2 and not more than 4.95.

Since the particulate active material for positive electrode contains not less than 50 wt % of the lithium composite oxide particle exhibiting a peak intensity ratio $(I_{003}/I_{104})$ of not less than 2 and less than 5, the molar ratio of $(Y_{Li}/Y_M)$ of the particulate active material for positive electrode becomes almost the same as the molar ratio of the lithium composite oxide particle. Therefore, if the molar ratio of $(Y_{Li}/Y_M)$ is decreased to less than 0.95, there will be many possibilities that the absorption and releasing of lithium ions or lithium element would not be caused to take place in the positive active material due to the deterioration in crystallinity of the lithium composite oxide particle. On the other hand, when the molar ratio of $(Y_{Li}/Y_M)$ is increased larger than 1.02, the ratio of primary particles in the lithium composite oxide particle would be increased even though the crystallinity of the lithium composite oxide particle would become excellent. As a result, the expansion and contraction of the lithium composite oxide particle resulting from the absorption and releasing of lithium ions or lithium element would become more prominent and at the same time, the protective film covering the primary particles would be isolated, thereby making it difficult to create a network structure. As a result, the protective film is more likely to be caused to peel off during the charge/discharge cycle, resulting in a shortened charge/discharge cycle life. More preferably, the range of molar ratio $(Y_{Li}/Y_M)$ should be 0.97 to 1.02, most preferably 0.99 to 1.02.

Since the particulate active material for positive electrode contains not less than 50 wt % of the lithium composite oxide particle, the particle size distribution of the lithium composite oxide particle will be extensively reflected in the particle size distribution of the particulate active material for positive electrode. When the particle diameter at a volumetric cumulative frequency of 90% (D90) of the particulate active material for the positive electrode is less than 10 μm, since the number of primary particles for constituting the secondary particles of the lithium composite oxide particle tends to decrease, the contact area between the secondary particles and the protective film becomes insufficient, rendering the protective film to peel off more easily, thus possibly resulting in a shortened charge/discharge cycle life. On the other hand, if D90 is larger than 25 μm, since the number of primary particles for constituting the secondary particles of the lithium composite oxide particle tends to increase, it would become impossible for the protective film to reach the interior of the secondary particles, thus creating nearly a state where only the surface of the secondary particles is covered by the protective film. As a result, the protective film is more likely to be caused to peel off during the charge/discharge cycle, resulting in a shortened charge/discharge cycle life. More preferable range of D90 would be 10 to 20 μm.

The larger is the content of the lithium composite oxide particle in the particulate active material for the positive electrode, the higher the adhesion would become between the positive electrode and the protective film. Accordingly, in order to realize elongated charge/discharge cycle life, the content of the lithium composite oxide particle in the particulate active material for the positive electrode should preferably be increased to 60 wt % or more, more preferably 70 wt % or more.

As for specific examples of the lithium composite oxide containing the element M, they include lithium nickel composite oxide, lithium cobalt composite oxide, lithium nickel cobalt composite oxide, etc. If it is desired to improve the characteristics of the positive electrode, the lithium composite oxide may contain elements other than lithium and the element M. Examples of such elements include, for example, Mn, Al, Sn, Fe, Cu, Cr, Zn, Mg, Si, P, F, Cl and B. These elements may be included therein singly or in combination of two or more kinds.

Among them, it is more preferable to employ oxides having a composition represented by the following formula (E) or formula (F).

$$Li_aCo_bM1_cO_2 \quad (E)$$

wherein M1 is at least one kind of element selected from the group consisting of Ni, Mn, B, Al and Sn; and a, b and c are respectively a molar ratio and fall within the ranges of: $0.95 \leq a \leq 1.05$; $0.95 \leq b \leq 1.05$; $0 \leq c \leq 0.05$; $0.95 \leq b+c \leq 1.05$; more preferable ranges of a, b and c being $0.97 \leq a \leq 1.03$; $0.97 \leq b \leq 1.03$; $0.001 \leq c \leq 0.03$.

$$Li_xNi_yCo_zM2_wO_2 \quad (F)$$

wherein M2 is at least one kind of element selected from the group consisting of Mn, B, Al and Sn; and x, y, z and w are respectively a molar ratio and fall within the ranges of: $0.95 \leq x \leq 1.05$; $0.7 \leq y \leq 0.95$; $0.05 \leq z \leq 0.3$; $0 \leq w \leq 0.1$; $0.95 \leq y+z+w \leq 1.05$; more preferable ranges of x, y and z being $0.97 \leq x \leq 1.03$; $0.75 \leq y \leq 0.9$; $0.1 \leq z \leq 0.25$; and more preferable range of w being $0 \leq w \leq 0.07$, further preferably $0 \leq w \leq 0.05$, most preferably $0 \leq w \leq 0.03$. In order to achieve a sufficient degree of effects expected to be derived from the inclusion of the element M2, the molar ratio w should preferably be at least 0.001.

In the aforementioned lithium composite oxide particle, all of the particles may not be constituted by the same composition but may be constituted by particles of two or more different kinds in composition as long as the peak intensity ratio thereof is not less than 2 and less than 5.

Further, although the particulate active material for the positive electrode may be constituted by the aforementioned lithium composite oxide particle, the particulate active material may contain different kinds of particle other than the lithium composite oxide particle.

As for specific examples of the aforementioned different kinds of particle, they include a lithium-containing composite oxide particle having a peak intensity ratio ($I_{003}/I_{104}$) of larger than 5. Since this lithium-containing composite oxide particle is capable of exhibiting a high activity in a charged state, the positive electrode containing the lithium-containing composite oxide particle is enabled, under a high-temperature environment, to readily react with a sultone compound in the nonaqueous electrolyte. As a result, when the secondary battery is stored in a charged state under a high-temperature environment, a protective film can be readily formed on the surface of positive electrode from the sultone compound, thus making it possible to inhibit the oxidative decomposition reaction of the nonaqueous electrolyte. Accordingly, since the generation of gas can be minimized on the occasion when the secondary battery is stored in a charged state under a high-temperature environment, the swelling of the battery can be suppressed, thus making it possible to provide a secondary battery having an elongated charge/discharge cycle life and being enabled to suppress the swelling thereof on the occasion of storing it in a charged state under a high-temperature environment. A more preferable range of the peak intensity ratio ($I_{003}/I_{104}$) would be 7 or more. However, if the lithium-containing composite oxide particle is constructed such that the peak intensity ratio thereof is larger than 500 or a peak originating from the (104) plane thereof cannot be detected, there are many possibilities that the lithium-containing composite oxide particle has a crystal structure which is incapable of absorbing lithium ions or lithium element. Therefore, it is preferable that the upper limit of the peak intensity ratio is 500 at most. In order to realize a secondary battery which is excellent both in charge/discharge cycle life and in high-temperature storage property under charged conditions, the mixing ratio of the lithium-containing composite oxide particle having a peak intensity ratio ($I_{003}/I_{104}$) of larger than 5 in the particulate active material for positive electrode should preferably fall within the range of not less than 0.1 wt % and less than 50 wt %, more preferably within the range of 0.5 to 48 wt %.

As for specific examples of the lithium-containing composite oxide, they include lithium cobalt composite oxide, etc. This lithium-containing composite oxide may further contain at least one kind of elements differing in kinds from the constituent elements. Examples of such additive elements include, for example, Ni, Mn, Al, Sn, Fe, Cu, Cr, Zn, Mg, Si, P, F, Cl and B. The composition of the lithium-containing composite oxide may be one represented by the aforementioned formula (E) or formula (F).

In the aforementioned lithium-containing composite oxide particle, all of the particles may not be constituted by the same composition but may be constituted by particles of two or more different kinds in composition as long as the peak intensity ratio thereof is larger than 5.

As for the conductor, the binder and the electronic collector, it is possible to employ the same kinds of materials as explained with reference to the aforementioned first nonaqueous electrolyte secondary battery.

The positive electrode can be manufactured in such a manner that an active material for positive electrode, a conductor and a binder are mixed with a suitable solvent to form a suspension, which is then coated on an electronic collector, dried and pressed.

Since the particulate active material for positive electrode to be employed in the aforementioned second nonaqueous electrolyte is featured in that it contains not less than 50 wt % of the lithium composite oxide powder including the element M, that it is enabled to exhibit a peak intensity ratio ($I_{003}/I_{104}$) of not less than 2 and less than 5, that it comprises secondary particles, that the molar ratio of ($Y_{Li}/Y_M$) thereof fall within the range of 0.95 to 1.02, and that the particle diameter at a volumetric cumulative frequency of 90% (D90) thereof fall within the range of 10 to 25 μm, it is possible to form a lithium ion-permeable protective film on the surface of the positive electrode through the reaction thereof with a sultone compound. Since this protective film can be formed not only on the surface of the secondary particles but also at the interstices between the primary particles, it is possible to provide a complicated network structure. As a result, it is possible to prevent the protective film from being peeled away from the positive electrode during the charge/discharge cycle and hence to suppress the oxidative decomposition reaction of the nonaqueous electrolyte, thus making it possible to enhance the charge/discharge cycle life of secondary battery.

A sheet-type nonaqueous electrolyte secondary battery, a prismatic nonaqueous electrolyte secondary battery, and a cylindrical nonaqueous electrolyte secondary battery, each representing one embodiment of the nonaqueous electrolyte secondary battery of the present invention, will be explained in detail with reference to FIGS. 1 to 4.

Figure 2:
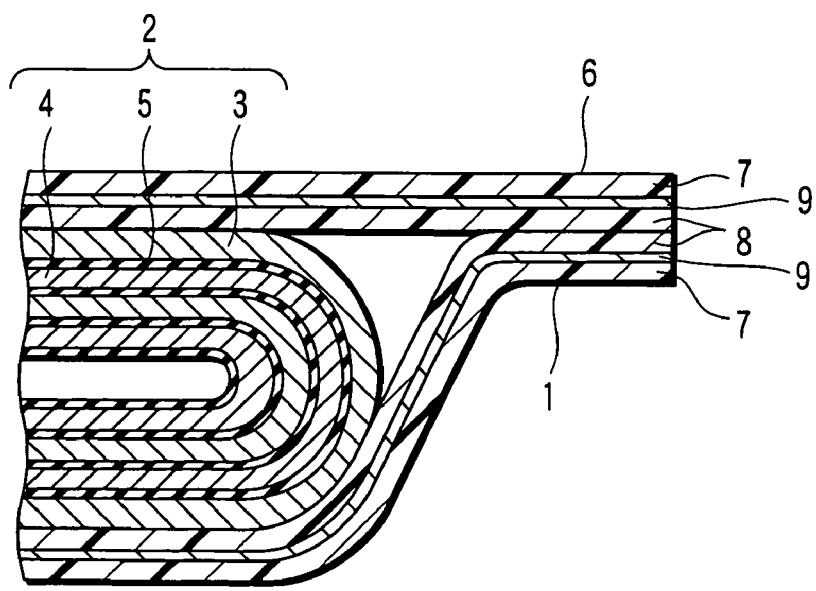
FIG. 2 is a partial cross-sectional view taken along the line II-II of the nonaqueous electrolyte secondary battery shown in FIG. 1.
Figure 3:
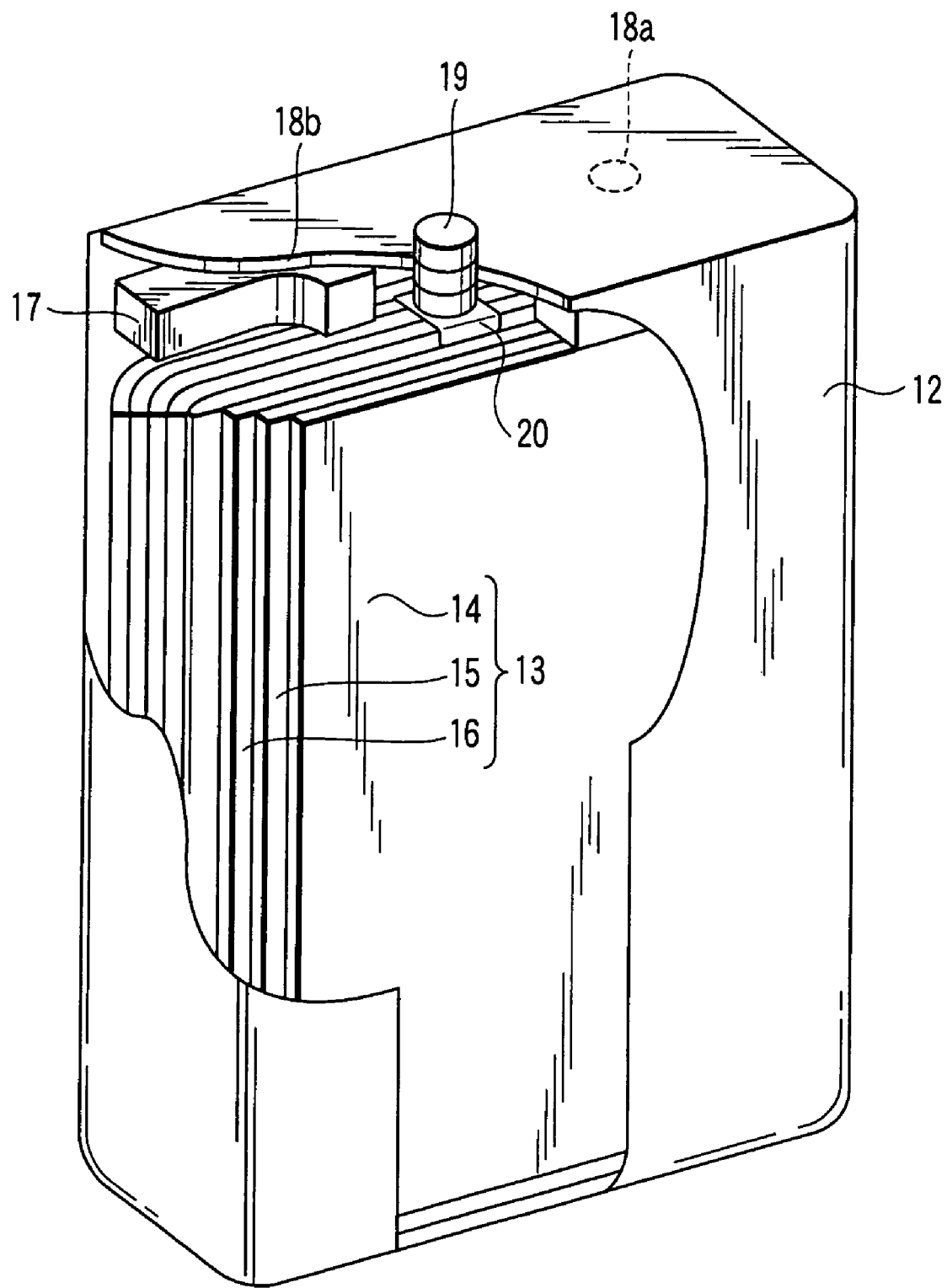
FIG. 3 is a partially cut perspective view illustrating a rectangular nonaqueous electrolyte secondary battery representing another embodiment of the nonaqueous electrolyte secondary battery according to the present invention.

FIG. 1 is a perspective view illustrating a sheet-type nonaqueous electrolyte secondary battery representing one embodiment of the nonaqueous electrolyte secondary battery of the present invention; FIG. 2 is a cross-sectional view illustrating a portion of the sheet-type nonaqueous electrolyte secondary battery shown in FIG. 1, which has been cut out along the shorter side thereof; FIG. 3 is a perspective view illustrating a prismatic nonaqueous electrolyte secondary battery representing another embodiment of the nonaqueous electrolyte secondary battery of the present invention; and FIG. 4 is a partially sectioned elevational view illustrating a cylindrical nonaqueous electrolyte secondary battery representing one embodiment of the nonaqueous electrolyte secondary battery of the present invention.

First of all, the details of the sheet-type nonaqueous electrolyte secondary battery will be explained.

As shown in FIG. 1, an electrode group 2 is housed in a main case body 1 having a rectangular cup-like configuration. This electrode group 2 is formed of a laminate structure comprising a positive electrode 3, a negative electrode 4 and a separator 5 interposed between the positive electrode 3 and the negative electrode 4, the laminate being wound so as to form a flattened configuration. The nonaqueous electrolyte is retained in this electrode group 2. Part of the brim portion of the main case body 1 is made larger in width, thus enabling it to serve as a cover plate 6. The main case body 1 and the cover plate 6 are both formed of a laminate film. This laminate film includes an outer protective layer 7, an inner protective layer 8 containing a thermoplastic resin, and a metal layer 9 interposed between the outer protective layer 7 and the inner protective layer 8. The cover plate 6 is secured to the main case body 1 by means of heat sealing by making use of the thermoplastic resin included in the inner protective layer 8, thereby hermetically sealing the electrode group 2 in the case. A positive electrode tab 10 is electrically connected to the positive electrode 3 and a negative electrode tab 11 is electrically connected to the negative electrode 4, these tabs being respectively extended outward from the case, thus enabling them to function as a positive terminal and a negative terminal, respectively.

Next, the details of the rectangular nonaqueous electrolyte secondary battery will be explained.

As shown in FIG. 3, an electrode group 13 is housed in a metallic bottomed rectangular case 12 formed of aluminum for example. This electrode group 13 is formed of a laminate structure comprising a positive electrode 14, a separator 15 and a negative electrode 16, which are laminated in the mentioned order and wound so as to form a flattened configuration. A spacer 17 provided with an opening at nearly the central portion thereof is arranged over the electrode group 13.

The nonaqueous electrolyte is retained in this electrode group 13. This secondary battery is provided with a rupture portion 18a. A sealing plate 18b having a circular hole at nearly the central portion thereof is welded to the opening of the case 12 by means of laser beam. A negative electrode terminal 19 is arranged via a hermetic seal at the circular hole of the sealing plate 18b. A negative electrode tab 20 which is extended outward from the negative electrode 16 is welded to a lower end portion of the negative terminal 19. On the other hand, a positive electrode tab (not shown) is connected with the case 12 serving also as a positive terminal.

Next, the details of the cylindrical nonaqueous electrolyte secondary battery will be explained.

A bottomed cylindrical case 21 made of stainless steel is constructed such that an insulator 22 is arranged at the bottom of the case 21. An electrode group 23 is housed in the case 21. This electrode group 23 is formed of a belt-like laminate comprising a positive electrode 24, a separator 25, a negative electrode 26 and another separator 25, which are laminated in the mentioned order and spirally wound so as to form a cylindrical configuration.

A nonaqueous electrolyte is housed in the case 21. An insulating paper 27 with a central opening is arranged over the electrode group 23 inside the case 21. An insulating sealing plate 28 is fixed to an upper opening of the case 21 by caulking. A positive terminal 29 is fitted in a central portion of the insulating sealing plate 28. One end of the positive lead 30 is connected with the positive electrode 24 and the other end of the positive lead 30 is connected with the positive terminal 29. The negative electrode 26 is connected, via a negative lead (not shown), with the case 21 serving as a negative terminal.

Next, examples of the present invention will be explained in detail with reference to drawings.

EXAMPLE 1

<Preparation of Positive Electrode>

A lithium composite oxide particles having a composition shown in the following Table 1 and exhibiting a particle diameter at a volumetric cumulative frequency of 90% (D90) and a peak intensity ratio ($I_{003}/I_{104}$), both shown in the following Table 1, were prepared. As a result of the observation of the lithium composite oxide particles by means of a scanning electron microscope (SEM), the inclusion of secondary particles therein was recognized. Incidentally, the volumetric cumulative frequency of 90% (D90) and the peak intensity ratio ($I_{003}/I_{104}$) were measured by the methods illustrated below.

<Measurement of D90>

The particle sizes at volume cumulative frequency 90% was measured by laser-beam diffraction and scattering analysis. The size and volume of each particle was measured with respect to the lithium composite oxide particles. The volumes of the smallest particle, the second smallest particle, and so on, are added until the sum reaches 90% of the total volume of all particles. The sum of volumes is volume cumulative frequency of 90%.

<Measurement of Peak Intensity Ratio>

In the measurement of X-ray diffraction, RINT2000 (Rigaku Denki Co., Ltd.) was employed. The measurement of peak intensity ratio was performed using Cu—Kα1 (wavelength: 1.5405 Å) as an X-ray source and under the following instrumental conditions. Lamp voltage was set to 40 kV; electric current was set to 40 mA; divergent slit was set to 0.5°; scattering slit was set to 0.5°; and receptor slit width was set to 0.15 mm. Further, a monochrometer was employed. The measurement was performed under the conditions of: 2°/min in scanning velocity; 0.010° in scanning step; and 2θ/θ in scanning axis. The peak which was appeared at 2θ of 45.0°±0.5° was a peak of the (104) plane, and the peak which was appeared at 2θ of 18.8°±0.2° was a peak of the (103) plane. The peak intensity (cps) was determined by subtracting background value from the measured value of diffraction pattern obtained with 2θ axis.

5 wt % of acetylene black, and an N-methyl-2-pyrrolidone (NMP) solution containing 5 wt % of polyvinylidene fluoride (PVdF) were added to and mixed with 90 wt % of the aforementioned lithium composite oxide powder to prepare slurry. The resultant slurry was coated on both surfaces of an electronic collector made of aluminum foil having a thickness of 15 μm and allowed to dry and subjected to pressing to manufacture a positive electrode having a structure where a positive electrode layer was held to the opposite surfaces of the electronic collector. Incidentally, the thickness of the positive electrode layer was set to 60 µm for each surface of the electronic collector.

<Manufacture of Negative Electrode>

95 wt % of the powder of mesophase pitch-based carbon fiber (the spacing ($d_{002}$) of (002) plane to be determined through the powder X-ray diffraction was 0.336 nm) which was heat-treated at a temperature of 3000° C. as a carbonaceous material, and a dimethylformamide (DMF) solution containing 5 wt % of polyvinylidene fluoride (PVdF) were mixed together to prepare slurry. The resultant slurry was coated on both surfaces of an electronic collector made of copper foil having a thickness of 12 µm and allowed to dry and subjected to pressing to manufacture a negative electrode having a structure where a negative electrode layer was held to the opposite surfaces of the electronic collector. Incidentally, the thickness of the negative electrode layer was set to 55 µm for each surface of the electronic collector.

Incidentally, the layer spacing $d_{002}$ of the (002) plane was obtained by the FWHM (Full Width at Half Maximum) middle point method from a powder X-ray diffraction spectrum. The scattering correction such as correction of the Lorentz scattering was not performed for obtaining the layer spacing $d_{002}$ of the (002) plane.

<Separator>

A separator made of a fine porous polyethylene film having a thickness of 25 µm was prepared.

<Preparation of Nonaqueous Electrolyte>

Ethylene carbonate (EC), γ-butyrolactone (GBL) and 1,3-propene sultone (PRS) were mixed together to prepare a nonaqueous solvent having a volume ratio of EC:GBL: PRS=33:66:1. Lithium tetrafluoroborate ($LiBF_4$) was dissolved in the nonaqueous solvent thus obtained so as to prepare a liquid nonaqueous electrolyte having a concentration of 1.5 mol/L.

<Preparation of Electrode Group>

A positive lead consisting of belt-like aluminum foil (100 µm in thickness) was welded to the electronic collector of positive electrode by means of ultrasonic welding. Further, a negative lead consisting of belt-like nickel foil (100 µm in thickness) was welded to the electronic collector of negative electrode by means of ultrasonic welding. Then, the positive electrode and the negative electrode were laminated with the separator being interposed between them to prepare a laminate, which was then spirally wound and molded into a flattened configuration, thus preparing an electrode group.

A laminate film having a thickness of 100 µm and made of aluminum foil having opposite surfaces covered with polyethylene layer was molded into a cup-like rectangular configuration by making use of a press. Then, the aforementioned electrode group was placed in this case.

Then, the electrode group housed inside the case was subjected to vacuum drying at a temperature of 80° C. for 12 hours to remove water included in the electrode group and laminate film.

Thereafter, liquid nonaqueous electrolyte was poured into the electrode group housed inside the case at a ratio of 4.8 g per 1 Ah of cell capacity. Then, the case was sealed by means of heat sealing to fabricate a sheet-type nonaqueous electrolyte secondary battery configured as shown in FIGS. 1 and 2 and having a thickness of 3.6 mm, a width of 35 mm and a height of 62 mm.

EXAMPLES 2-8

By following-the same procedures as explained in the aforementioned Example 1 except that the composition of the nonaqueous electrolyte was altered as shown in the following Table 2, sheet-type nonaqueous electrolyte secondary batteries were fabricated.

Incidentally, in Table 2, DEC is diethyl carbonate, MEC is methylethyl carbonate, PC is propylene carbonate, and BTS is 1,4-butylene sultone.

EXAMPLES 9-17

By following the same procedures as explained in the aforementioned Example 1 except that the molar ratio of ($X_{Li}/X_M$), the peak intensity ratio ($I_{003}/I_{104}$), and the particle diameter at a volumetric cumulative frequency of 90% (D90) were altered as shown in the following Table 1, sheet-type nonaqueous electrolyte secondary batteries were fabricated.

COMPARATIVE EXAMPLES 1-5

By following the same procedures as explained in the aforementioned Example 1 except that the composition of the nonaqueous electrolyte was altered as shown in the following Table 4, sheet-type nonaqueous electrolyte secondary batteries were fabricated.

Incidentally, in Table 4, EC denotes ethylene carbonate, MEC is methylethyl carbonate, PRS is 1,3-propene sultone, DEC is diethyl carbonate, GBL is γ-butyrolactone, PC is propylene carbonate, and PS is propane sultone.

COMPARATIVE EXAMPLES 6-10

By following the same procedures as explained in the aforementioned Example 1 except that the molar ratio of ($X_{Li}/X_M$), the peak intensity ratio ($I_{003}/I_{104}$) and the particle diameter at a volumetric cumulative frequency of 90% (D90) were altered as shown in the following Table 3, sheet-type nonaqueous electrolyte secondary batteries were fabricated.

The secondary batteries of Examples 1-17 and Comparative Examples 1-10, all obtained as described above, were evaluated with respect to the charge/discharge cycle characteristics thereof under the conditions explained below, the results obtained are shown in the following Tables 2 and 4.

(Charge/Discharge Cycle Characteristics)

Every secondary batteries were respectively subjected to the initial Charge/discharge treatment wherein constant-current/constant-voltage charging was continued for 15 hours at room temperature with an electric current of 0.2 C (130 mA) to increase the voltage thereof up to 4.2V and then discharging was performed at room temperature with an electric current of 0.2 C until the voltage thereof was decreased to 3.0V.

Then, in order to evaluate the charge/discharge cycle characteristics of these batteries, the charge/discharge cycle was repeated 500 times in an environment of 20° C. in temperature and under the conditions of: 1 C in charge/discharge rate, 4.2V in charge-terminating voltage, and 3.0V in discharge-terminating voltage, thereby determining the discharge capacity retention rate (the capacity at the first discharging was assumed as 100%).

TABLE 1

|  | Composition of lithium composite oxide | Molar ratio between Li and element M ($X_{Li}/X_M$) | Peak intensity ratio ($I_{003}/I_{104}$) | D90 (µm) |
|---|---|---|---|---|
| Example 1 | $LiCoCO_2$ | 1.00 | 3.4 | 15.25 |
| Example 2 | $LiCoCO_2$ | 1.00 | 3.4 | 15.25 |
| Example 3 | $LiCoCO_2$ | 1.00 | 3.4 | 15.25 |
| Example 4 | $LiCoCO_2$ | 1.00 | 3.4 | 15.25 |
| Example 5 | $LiCoCO_2$ | 1.00 | 3.4 | 15.25 |
| Example 6 | $LiCoCO_2$ | 1.00 | 3.4 | 15.25 |
| Example 7 | $LiCoCO_2$ | 1.00 | 3.4 | 15.25 |

TABLE 1-continued

|  | Composition of lithium composite oxide | Molar ratio between Li and element M ($X_{Li}/X_M$) | Peak intensity ratio ($I_{003}/I_{104}$) | D90 (μm) |
|---|---|---|---|---|
| Example 8 | $LiCoCO_2$ | 1.00 | 3.4 | 15.25 |
| Example 9 | $LiCoCO_2$ | 1.00 | 2.43 | 13.96 |
| Example 10 | $LiCoCO_2$ | 1.00 | 2.65 | 14.07 |
| Example 11 | $Li_{0.996}CoO_2$ | 0.996 | 2.8 | 18.5 |
| Example 12 | $Li_{1.01}CoO_2$ | 1.01 | 2.4 | 11.9 |
| Example 13 | $Li_{1.01}CoO_2$ | 1.01 | 2.17 | 23.5 |
| Example 14 | $Li_{0.998}Ni_{0.2}Co_{0.8}O_2$ | 0.998 | 3.87 | 16.2 |
| Example 15 | $LiNi_{0.2}Co_{0.8}O_2$ | 1.00 | 2.55 | 15.06 |
| Example 16 | $LiNi_{0.5}Co_{0.5}O_2$ | 1.00 | 4.23 | 12.87 |
| Example 17 | $LiNi_{0.8}Co_{0.2}O_2$ | 1.00 | 3.88 | 14.93 |

TABLE 2

|  | Kinds of mixing ratio of main solvent (% is vol %) | Kinds and concentration of electrolyte | Kinds and mixing ratio of sultone compounds | Capacity retention ratio (%) after 500 cycles |
|---|---|---|---|---|
| Example 1 | 33% EC, 66% GBL | 1.5 M-$LiBF_4$ | PRS-1 vol % | 87 |
| Example 2 | 49.5% EC, 49.5% PC | 1.0 M-$LiPF_6$ | PRS-1 vol % | 85 |
| Example 3 | 33% EC, 66% MEC | 1.0 M-$LiPF_6$ | PRS-1 vol % | 88 |
| Example 4 | 33% EC, 33% MEC, 33% DEC | 1.0 M-$LiPF_6$ | PRS-1 vol % | 92 |
| Example 5 | 33% EC, 66% GBL | 1.5 M-$LiBF_4$ | BTS-1 vol % | 86 |
| Example 6 | 49.5% EC, 49.5% PC | 1.0 M-$LiPF_6$ | BTS-1 vol % | 84 |
| Example 7 | 33% EC, 66% MEC | 1.0 M-$LiPF_6$ | BTS-1 vol % | 87 |
| Example 8 | 33% EC, 33% MEC, 33% DEC | 1.0 M-$LiPF_6$ | BTS-1 vol % | 91 |
| Example 9 | 33% EC, 66% GBL | 1.5 M-$LiBF_4$ | PRS-1 vol % | 88 |
| Example 10 | 33% EC, 66% GBL | 1.5 M-$LiBF_4$ | PRS-1 vol % | 88 |
| Example 11 | 33% EC, 66% GBL | 1.5 M-$LiBF_4$ | PRS-1 vol % | 87 |
| Example 12 | 33% EC, 66% GBL | 1.5 M-$LiBF_4$ | PRS-1 vol % | 86 |
| Example 13 | 33% EC, 66% GBL | 1.5 M-$LiBF_4$ | PRS-1 vol % | 78 |
| Example 14 | 33% EC, 66% GBL | 1.5 M-$LiBF_4$ | PRS-1 vol % | 89 |
| Example 15 | 33% EC, 66% GBL | 1.5 M-$LiBF_4$ | PRS-1 vol % | 88 |
| Example 16 | 33% EC, 66% GBL | 1.5 M-$LiBF_4$ | PRS-1 vol % | 85 |
| Example 17 | 33% EC, 66% GBL | 1.5 M-$LiBF_4$ | PRS-1 vol % | 84 |

TABLE 3

|  | Composition of lithium composite oxide | Molar ratio between Li and element M ($X_{Li}/X_M$) | Peak intensity ratio ($I_{003}/I_{104}$) | D90 (μm) |
|---|---|---|---|---|
| Comp. Ex. 1 | $LiCoO_2$ | 1.00 | 3.4 | 15.25 |
| Comp. Ex. 2 | $LiCoO_2$ | 1.00 | 3.4 | 15.25 |
| Comp. Ex. 3 | $LiCoO_2$ | 1.00 | 3.4 | 15.25 |
| Comp. Ex. 4 | $LiCoO_2$ | 1.00 | 3.4 | 15.25 |
| Comp. Ex. 5 | $LiCoO_2$ | 1.00 | 3.4 | 15.25 |
| Comp. Ex. 6 | $Li_{0.994}CoO_2$ | 0.994 | 5.1 | 7.25 |
| Comp. Ex. 7 | $Li_{1.03}CoO_2$ | 1.03 | 250 | 10.25 |
| Comp. Ex. 8 | $Li_{1.04}CoO_2$ | 1.04 | 16 | 5.76 |
| Comp. Ex. 9 | $Li_{1.01}CoO_2$ | 1.01 | 2.4 | 26 |
| Comp. Ex. 10 | $Li_{1.01}Ni_{0.2}Co_{0.8}O_2$ | 1.01 | 10 | 6.8 |

TABLE 4

|  | Kinds and mixing ratio of main solvent (% is vol %) | Kinds and concentration of electrolyte | Kinds and mixing ratio of sultone compounds | Capacity retention ratio (%) after 500 cycles |
|---|---|---|---|---|
| Comp. Ex. 1 | 33.4% EC, 66.6% GBL | 1.5 M-$LiBF_4$ | Not added | 42 |
| Comp. Ex. 2 | 50% EC, 50% PC | 1.0 M-$LiPF_6$ | Not added | 20 |
| Comp. Ex. 3 | 33.4% EC, 66.6% MEC | 1.0 M-$LiPF_6$ | Not added | 36 |
| Comp. Ex. 4 | 33.4% EC, 33.3% MEC, 33.3% DEC | 1.0 M-$LiPF_6$ | Not added | 42 |
| Comp. Ex. 5 | 33% EC, 66% GBL | 1.5 M-$LiBF_4$ | PS-1 vol % | 35 |
| Comp. Ex. 6 | 33% EC, 66% GBL | 1.5 M-$LiBF_4$ | PRS-1 vol % | 66 |
| Comp. Ex. 7 | 33% EC, 66% GBL | 1.5 M-$LiBF_4$ | PRS-1 vol % | 62 |

TABLE 4-continued

| | Kinds and mixing ratio of main solvent (% is vol %) | Kinds and concentration of electrolyte | Kinds and mixing ratio of sultone compounds | Capacity retention ratio (%) after 500 cycles |
|---|---|---|---|---|
| Comp. Ex. 8 | 33% EC, 66% GBL | 1.5 M-LiBF$_4$ | PRS-1 vol % | 58 |
| Comp. Ex. 9 | 33% EC, 66% GBL | 1.5 M-LiBF$_4$ | PRS-1 vol % | 38 |
| Comp. Ex. 10 | 33% EC, 66% GBL | 1.5 M-LiBF$_4$ | PRS-1 vol % | 23 |

As apparent from Tables 1 to 4, it was recognized that the secondary batteries of Examples 1-17 which comprised lithium composite oxides with the molar ratio of $(X_{Li}/X_M)$ falling within the range of 0.95 to 1.02, the peak intensity ratio $(I_{003}/I_{104})$ being not less than 2 and less than 5, and the D90 falling within the range of 10 to 25 μm, and sultone compounds having at least one double bond in the ring thereof were all higher in the capacity retention rate after the repetition of 500 times of charge/discharge cycle as compared with the secondary batteries of Comparative Examples 1-10. Among these secondary batteries, the secondary batteries of Examples 1-12 and 14-17 were found further enhanced in the capacity retention rate after the repetition of 500 times of charge/discharge cycle as compared with the secondary battery of Example 13.

Incidentally, the secondary batteries of Comparative Examples 1-4 where the sultone compound was not employed, the secondary battery of Comparative Example 5 where PS having no double bond was employed as an additive, the secondary batteries of Comparative Examples 6 and 10 where the peak intensity ratio was larger than 5 and the D90 was less than 10 μm, the secondary battery of Comparative Example 7 where the molar ratio was larger than 1.02 and the peak intensity ratio was larger than 5, the secondary battery of Comparative Example 8 where the molar ratio was larger than 1.02, the peak intensity ratio was larger than 5 and the D90 was less than 10 μm, and the secondary battery of Comparative Example 9 where the D90 was higher than 25 μm were all as low as less than 70% in the capacity retention rate after the repetition of 500 times of charge/discharge cycle.

EXAMPLE 18

70 wt % of LiCoO$_2$ particle (a first active particle) with the D90 being 15.25 μm and the peak intensity ratio $(I_{003}/I_{104})$ being 3.4, and 30 wt % of LiNi$_{0.8}$Co$_{0.2}$Mn$_{0.06}$O$_2$ particle (a second active particle) with the D90 being 14.93 μm and the peak intensity ratio $(I_{003}/I_{104})$ being 3.8 were mixed together to obtain a particulate active material for positive electrode. It was confirmed, as a result of the observation by means of a scanning electron microscope (SEM), part of the first active material was brought into a state of secondary particles.

The D90 of the particulate active material for positive electrode and the molar ratio $(Y_{Li}/Y_M)$ thereof are shown in the following Table 5.

By following the same procedures as explained in the aforementioned Example 1 except that the particulate active material for positive electrode thus obtained was employed, a sheet-type nonaqueous electrolyte secondary battery having the same configuration as that of Example 1 was fabricated.

EXAMPLES 19-24

By following the same procedures as explained in the aforementioned Example 1 except that the compositions, peak intensity ratio $(I_{003}/I_{104})$ and D90 of the first and the second active materials; the mixing ratio of the first active material in the particulate active particle for positive electrode; and the D90 and the molar ratio $(Y_{Li}/Y_M)$ of the particulate active particle for positive electrode were altered as shown in the following Table 5, sheet-type nonaqueous electrolyte secondary batteries each having the same configuration as that of Example 1 were fabricated.

In the same manner as explained in the aforementioned Example 1, the capacity retention rate after the repetition of 500 times of charge/discharge cycle was performed on each of the secondary batteries of Examples 18 to 24, the results being illustrated in the following Table 6. Further, with respect to the secondary batteries of Examples 18 to 24 and Example 1, high-temperature charge storage properties thereof were evaluated under the conditions described below, the results being illustrated in the following Table 6.

(High-Temperature Charge Storage Properties)

These secondary batteries were respectively subjected to charging treatment under the conditions of: 1 C in charging rate, and 4.2V in charge-terminating voltage. Then, these secondary batteries were respectively stored for 120 hours in an environment of 80° C. in temperature and, according to the following formula (I), the thickness of the battery case was respectively measured to determine the rate of thickness change of the battery case being stored in this manner.

$$\{(t_1 - t_0)/t_0\} \times 100(\%) \tag{I}$$

wherein $t_0$ is the thickness of the battery case before the storage thereof; and $t_1$ is the thickness of the battery case after the storage thereof for 120 hours.

TABLE 5

| | A first active material | | | | A second active material | | | Positive active material (molar ratio) ($Y_{Li}/Y_M$) | D90 (μm) |
|---|---|---|---|---|---|---|---|---|---|
| | Composition | Peak intensity ratio ($I_{003}/I_{104}$) | D90 (μm) | Ratio (wt %) | Composition | Peak intensity ratio ($I_{003}/I_{104}$) | D90 (μm) | | |
| Ex. 1 | LiCoO$_2$ | 3.4 | 15.25 | 100 | — | — | — | 1.00 | 15.25 |
| Ex. 18 | LiCoO$_2$ | 3.4 | 15.25 | 70 | LiNi$_{0.8}$Co$_{0.2}$Mn$_{0.06}$O$_2$ | 3.8 | 14.93 | 1.00 | 15.1 |
| Ex. 19 | LiCoO$_2$ | 3.4 | 15.25 | 70 | LiNi$_{0.8}$Co$_{0.2}$Al$_{0.06}$O$_2$ | 3.8 | 14.93 | 1.00 | 15.1 |

TABLE 5-continued

| | A first active material | | | | A second active material | | | Positive active material (molar ratio) ($Y_{Li}/Y_M$) | D90 (μm) |
|---|---|---|---|---|---|---|---|---|---|
| | Composition | Peak intensity ratio ($I_{003}/I_{104}$) | D90 (μm) | Ratio (wt %) | Composition | Peak intensity ratio ($I_{003}/I_{104}$) | D90 (μm) | | |
| Ex. 20 | $LiCoO_2$ | 3.4 | 15.25 | 80 | $Li_{1.04}CoO_2$ | 30 | 16 | 1.01 | 15.5 |
| Ex. 21 | $LiCoO_2$ | 3.4 | 15.25 | 80 | $Li_{1.05}Co_{0.97}Sn_{0.03}O_2$ | 50 | 6 | 1.02 | 13.0 |
| Ex. 22 | $LiCoO_2$ | 3.4 | 15.25 | 80 | $Li_{1.04}CoSn_{0.0007}O_2$ | 10 | 16 | 1.00 | 15.5 |
| Ex. 23 | $LiNi_{0.8}Co_{0.2}Mn_{0.06}O_2$ | 3.8 | 14.93 | 80 | $Li_{1.05}Co_{0.97}Sn_{0.03}O_2$ | 50 | 6 | 1.02 | 12.5 |
| Ex. 24 | $LiNi_{0.8}Co_{0.2}Al_{0.06}O_2$ | 3.8 | 14.93 | 80 | $Li_{1.05}Co_{0.97}Sn_{0.03}O_2$ | 50 | 6 | 1.02 | 12.5 |

TABLE 6

| | Rate of change in thickness of battery case | Capacity retention ratio (%) after 500 cycles |
|---|---|---|
| Example 1 | 1.82 | 87 |
| Example 18 | 1.78 | 90 |
| Example 19 | 1.69 | 91 |
| Example 20 | 1.29 | 88 |
| Example 21 | 1.12 | 88 |
| Example 22 | 1.59 | 89 |
| Example 23 | 1.38 | 88 |
| Example 24 | 1.32 | 89 |

As apparent from Tables 5 and 6, it was recognized that the secondary batteries of Examples 18 and 19 which comprised positive electrodes containing active materials for positive electrode made from two kinds of lithium cobalt-containing composite oxides with the peak intensity ratio ($I_{003}/I_{104}$) being not less than 2 and less than 5 were all more excellent in the charge/discharge cycle retention factor as compared with the secondary battery of Example 1 and the rate of thickness change thereof was also improved more or less.

Further, the secondary batteries of Examples 20-24 which comprised positive electrodes containing lithium/element M-containing composite oxides with the peak intensity ratio ($I_{003}/I_{104}$) being not less than 2 and less than 5, and lithium-containing composite oxides with the peak intensity ratio ($I_{003}/I_{104}$) being larger than 5 were all found capable of minimizing the swelling of the case during the high-temperature storage thereof under charged conditions as compared with the battery of Example 1 while making it possible to keep a high value in capacity retention rate after the repetition of 500 times of charge/discharge cycle.

Incidentally, the number of moles of the element M in the particulate active material for positive electrode in the aforementioned Examples represents the number of moles of either Ni or Co if the particulate active material for positive electrode contained either Ni or Co; and otherwise represents a total number of moles of Ni and Co if the particulate active material for positive electrode contained both Ni and Co.

(Method of Detecting PRS)

Figure 5:
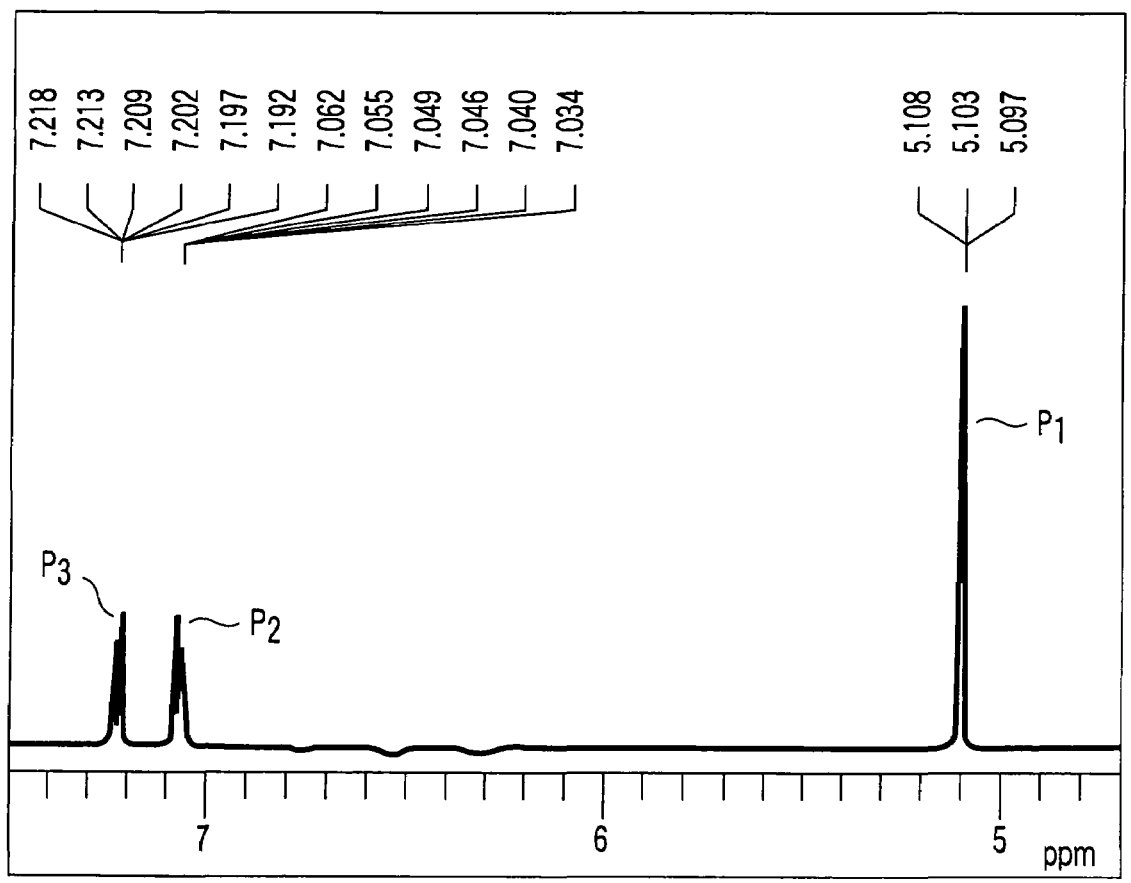
FIG. 5 is a graph showing an $^1$HNMR spectrum of PRS contained in the nonaqueous electrolyte of the nonaqueous electrolyte secondary battery of Example 1.

After the initial charge-discharge step, the circuit of the secondary battery for Example 1 was left open for 5 hours or more so as to stabilize sufficiently the potential of the secondary battery. Then, the secondary battery was dismantled within a glove box having an Ar concentration of 99.9% or more and a dew point not higher than −50° C. so as to take out the electrode group. The electrode group was, then, put in a centrifugal tube, and dimethyl sulfoxide (DMSO)-$d_6$ was added to the centrifugal tube, followed by sealing the centrifugal tube. Further, the centrifugal tube was taken out of the glove box and subjected to the centrifugal separation. In the next step, a mixed solution consisting of the liquid electrolyte and DMSO-$d_6$ was taken from the centrifugal tube within the glove box. The mixed solution in an amount of about 0.5 mL was put in an NMR test tube of 5 mm φ so as to carry out the NMR measurement. An apparatus "JNM-LA400WB" manufactured by JEOL. Ltd, was used for the NMR measurement. The observed nucleus was $^1H$, the observation frequency was 400 MHz, and the residual proton signal that was slightly contained (2.5 ppm) in dimethyl sulfoxide (DMSO)-$d_6$ was utilized as an internal standard. The measuring temperature was set at 25° C. In the $^1HNMR$ spectrum, a peak corresponding to EC (ethylene carbonate) was observed in the vicinity of 4.5 ppm, and the peaks corresponding to PRS was observed in the vicinity of 5.1 ppm ($P_1$), in the vicinity of 7.05 ppm ($P_2$) and in the vicinity of 7.2 ppm ($P_3$) as seen in the spectrum shown in (FIG. 5. It was confirmed from these results that PRS was included in the nonaqueous solvent existed in the secondary battery of Example 1 after the initial charging/discharging process.

Additionally, when $^{13}C$ NMR measurement was performed with the observation frequency being set to 100 MHz and the dimethyl sulfoxide (DMSO)-$d_6$ (39.5 ppm) being employed as an internal standard. As a result, the peak corresponding to EC was observed in the vicinity of 66 ppm, and the peak corresponding to PRS was observed in the vicinity of 74 ppm, in the vicinity of 124 ppm and in the vicinity of 140 ppm. It was confirmed from these results also that PRS was included in the nonaqueous solvent existed in the secondary battery of Example 1 after the initial charging/discharging process.

Furthermore, it was confirmed, through the determination of the ratio of the NMR integral intensity of PRS to the NMR integral intensity of EC in the $^1H$ NMR spectrum, that the ratio of PRS to the quantity of the nonaqueous solvent was decreased as compared with that prior to the assembling of the secondary battery.

Incidentally, the present invention would not be restricted to the aforementioned Examples but can be applied likewise to any other kind of combination of positive electrode/negative electrode/separator/case.

As described above, according to the present invention, it is possible to provide a nonaqueous electrolyte secondary battery which is improved in charge/discharge cycle life.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery comprising a negative electrode, a nonaqueous electrolyte, and a positive electrode containing an active material containing lithium composite oxide particles; wherein the lithium composite oxide particles have a composition containing element M including Ni and/or Co, include secondary particles, and exhibit a peak intensity ratio that satisfies the following formula (1), a content of the lithium composite oxide particles in the active material is at least 50 wt %;

the active material satisfies the following formula (2), and has a particle distribution wherein a particle diameter at a volumetric cumulative frequency of 90% (D90) falls within the range of 10 to 25 μm; and the nonaqueous electrolyte contains a sultone compound including a ring having at least one double bond;

$$2.4 \leq (I_{003}/I_{104}) < 5 \quad (1)$$

$$0.95 \leq (Y_{Li}/Y_M) \leq 1.02 \quad (2)$$

wherein $I_{003}$ is a peak intensity (cps) at (003) plane in powder X-ray diffraction of the lithium composite oxide particles; $I_{104}$ is a peak intensity (cps) at (104) plane in said powder X-ray diffraction; $Y_{Li}$ is the number of moles of lithium in the active material; and $Y_M$ is the number of moles of the element M in the active material.

2. The nonaqueous electrolyte secondary battery according to claim 1, wherein the peak intensity ratio $(I_{003}/I_{104})$ is 2.4 to 4.95.

3. The nonaqueous electrolyte secondary battery according to claim 1, wherein the molar ratio $(Y_{Li}/Y_M)$ is not less than 0.97 and not more than 1.02.

4. The nonaqueous electrolyte secondary battery according to claim 1, wherein the particle diameter at the volumetric cumulative frequency of 90% (D90) falls within the range of 10 to 20 μm.

5. The nonaqueous electrolyte secondary battery according to claim 1, wherein the lithium composite oxide particles further contains at least one kind of element selected from the group consisting of Mn, Al, Sn, Fe, Cu, Cr, Zn, Mg, Si, P, F, Cl and B.

6. The nonaqueous electrolyte secondary battery according to claim 1, wherein the active material is the lithium composite oxide particles.

7. The nonaqueous electrolyte secondary battery according to claim 1, wherein the active material further contains lithium-containing composite oxide particles exhibiting a peak intensity ratio which satisfies the following formula (3)

$$(I_{003}/I_{104}) > 5 \quad (3)$$

wherein $I_{003}$ is a peak intensity (cps) at (003) plane in powder X-ray diffraction of the lithium-containing composite oxide particles; $I_{104}$ is a peak intensity (cps) at (104) plane in said powder X-ray diffraction.

8. The nonaqueous electrolyte secondary battery according to claim 7, wherein the lithium-containing composite oxide particles further contains Co.

9. The nonaqueous electrolyte secondary battery according to claim 7, wherein a content of the lithium-containing composite oxide particles in the active material is not less than 0.1 wt % and less than 50 wt %.

10. The nonaqueous electrolyte secondary battery according to claim 1, wherein the sultone compound includes 1,3-propene sultone and/or 1,4-butylene sultone.

11. The nonaqueous electrolyte secondary battery according to claim 1, wherein the active material is the lithium composite oxide particles represented by the following formula (E):

$$Li_a Co_b M1_c O_2 \quad (E)$$

wherein M1 is at least one kind of element selected from the group consisting of Ni, Mn, B, Al and Sn; and a, b and c are respectively a molar ratio and fall within the ranges of: $0.95 \leq a \leq 1.05$; $0.95 \leq b \leq 1.05$; $0 \leq c \leq 0.05$; $0.95 \leq b+c \leq 1.05$.

12. A nonaqueous electrolyte secondary battery comprising a negative electrode, a nonaqueous electrolyte, and a positive electrode including an active material containing lithium composite oxide powder; wherein the lithium composite oxide powder includes secondary particles, exhibits a peak intensity ratio satisfying the following formula (4), satisfies the following formula (5), and has a particle distribution wherein a particle diameter at a volumetric cumulative frequency of 90% (D90) falls within the range of 10 to 25 μm;

the nonaqueous electrolyte contains a sultone compound including a ring having at least one double bond;

$$2.4 \leq (I_{003}/I_{104}) < 5 \quad (4)$$

$$0.95 \leq (X_{Li}/X_M) \leq 1.02 \quad (5)$$

wherein $I_{003}$ is a peak intensity (cps) at (003) plane in powder X-ray diffraction of the lithium composite oxide powder; $I_{104}$ is a peak intensity (cps) at (104) plane in said powder X-ray diffraction; $X_{Li}$ is the number of moles of lithium in the lithium composite oxide powder; and $X_M$ is the number of moles of an element M in the lithium composite oxide powder, the element M including Ni and/or Co.

13. The nonaqueous electrolyte secondary battery according to claim 12, wherein a content of the lithium composite oxide powder in the active material is not less than 50 wt %.

14. The nonaqueous electrolyte secondary battery according to claim 12, wherein the sultone compound includes 1,3-propene sultone and/or 1,4-butylene sultone.

15. The nonaqueous electrolyte secondary battery according to claim 12, wherein the peak intensity ratio $(I_{003}/I_{104})$ is 2.4 to 4.95.

16. The nonaqueous electrolyte secondary battery according to claim 12, wherein the molar ratio $(X_{Li}/X_M)$ is not less than 0.97 and not more than 1.02.

17. The nonaqueous electrolyte secondary battery according to claim 12, wherein the particle diameter at the volumetric cumulative frequency of 90% (D90) falls within the range of 10 to 20 μm.

18. The nonaqueous electrolyte secondary battery according to claim 12, wherein the lithium composite oxide powder further contains at least one kind of element selected from the group consisting of Mn, Al, Sn, Fe, Cu, Cr, Zn, Mg, Si, P, F, Cl and B.

19. The nonaqueous electrolyte secondary battery according to claim 12, wherein the active material further contains lithium-containing composite oxide powder exhibiting a peak intensity ratio which satisfies the following formula (3)

$$(I_{003}/I_{104}) > 5 \quad (3)$$

wherein $I_{003}$ is a peak intensity (cps) at (003) plane in powder X-ray diffraction of the lithium-containing composite oxide powder; $I_{104}$ is a peak intensity (cps) at (104) plane in said powder X-ray diffraction.

20. The nonaqueous electrolyte secondary battery according to claim 12, wherein the active material is the lithium composite oxide powder represented by the following formula (E):

$$Li_a Co_b M1_c O_2 \quad (E)$$

wherein M1 is at least one kind of element selected from the group consisting of Ni, Mn, B, Al and Sn; and a, b and c are respectively a molar ratio and fall within the ranges of: $0.95 \leq a \leq 1.05$; $0.95 \leq b \leq 1.05$; $0 \leq c \leq 0.05$; $0.95 \leq b+c \leq 1.05$.

* * * * *